United States Patent Office 2,742,442
Patented Apr. 17, 1956

2,742,442

COMPOSITION COMPRISING NITROCELLULOSE AND A SILICO-ALKYD RESIN

Robert C. Hedlund, Midland, Mich., assignor to Dow Corning Corporation, Midland, Mich., a corporation of Michigan No Drawing. Application November 17, 1952, Serial No. 321,060

8 Claims. (Cl. 260—16)

This invention relates to an improved nitrocellulose lacquer.

This invention relates specifically to new lacquer compositions consisting essentially of (1) 25 to 90 per cent by weight nitrocellulose and (2) 10 to 75 per cent by weight of silico-alkyd resin. The silico-alkyd resin employed consists of the reaction products of (a) 25 to 90 per cent by weight of organosilicon compound (b) 2.5 to 49 per cent by weight glycerine, (c) 5.2 to 62 per cent by weight of dicarboxylic acid and (d) up to 60 per cent by weight of fatty acids having 8 to 20 carbon atoms. In the final product, there is at least 2 per cent and no more than 30 per cent by weight based on the total of nitrocellulose and silico-alkyd resin of the reaction residue of the organosilicon component (a) such reaction residue being calculated as $$R_n SiO_{\frac{4-n}{2}}$$

The lacquer compositions in this invention are characterized by exceptional stability when exposed to atmospheric conditions. This stability is exemplified by high gloss retention and freedom from crazing and cracking. The exceptional properties of these lacquers are obtained merely upon air drying, although short curings or bakes at 150° C. may be employed with beneficial results for specific applications. The lacquers of this invention are eminently adaptable for use as coatings on metal surfaces such as are found on automobile bodies.

Any nitrocellulose suitable for employment in lacquer formulations may be employed herein. Excellent results are obtained using ¼ to ½ second regularly soluble (R. S. grade) nitrocellulose.

The silico-alkyd resin employed in this invention consists of the reaction product of (a) 25 to 90 per cent by weight of silanes or the partial condensate of silanes having the general formula $R_nSiX_{4-n}$ where R is a monovalent hydrocarbon radical, X is a hydrolyzable radical or a hydroxy radical and n has a value of from 1 to 2 inclusive, (b) 2.5 to 49 per cent by weight glycerine, (c) 5.2 to 62 per cent by weight of a dicarboxylic acid, and (d) up to 60 per cent of a fatty acid having 8 to 20 carbon atoms.

The silanes or partial condensates thereof (component a) employed to form the silico-alkyd resin have the general formula $R_nSiX_{4-n}$ where R is a hydrocarbon radical such as, for example, cyclohexyl, methyl, allyl, stearyl, phenyl, or xylyl, and X is a hydrolyzable radical such as alkoxy, acyloxy, halogen, and amino, or a hydroxy radical. Preferred silanes or partially condensed silanes are those wherein R is an alkyl radical of less than 5 carbon atoms or monocyclic aryl, and X is an alkoxy radical of less than 4 carbon atoms, bromine, chlorine, or hydroxy. Suitable silanes are, for example, $(CH_3)SiCl_3$, $(CH_3)_2Si(OC_2H_5)_2$, $C_6H_5C_2H_5SiBr_2$
$(CH_3)C_6H_5Si(OC_3H_7)_2$, $(C_4H_9)_2Si(OOCCH_3)_2$
$C_2H_5Si(OCH_3)_3$, $(t-C_4H_9)_2Si(NH_2)_2$, $(C_6H_5)_2Si(OH)_2$
$(C_8H_9)CH_3SiCl_2$ (xylyl methyl dichloro silane), etc. The hydrocarbon radicals of the silanes or silane partial condensates are not critical to this invention. However, on the basis of commercial availability and cost silanes (and partial condensates thereof) wherein R is methyl and/or phenyl are particularly desirable for use herein. Either single or mixed silanes or partial condensates of single or mixed silanes may be used herein with equal facility. Silanes or silane mixtures which may include traces of such silanes as $SiCl_4$, $(CH_3)_3SiCl$, $Si(OC_2H_5)_4$, etc., may be readily and directly condensed with glycerine and dicarboxylic acid. Silanes having hydrolyzable radicals such as amino, halogen or alkoxy radicals of less than 5 carbon atoms are preferred since upon condensation, they form by-products which readily distill off. By-products not readily distillable may, of course, be removed from the reaction by water or solvent wash, or filtration.

With equal ease a partially condensed silane may be condensed with glycerine and dicarboxylic acid. Partially condensed silanes are those which contain at least 0.5 per cent by weight silicon bonded hydroxy radicals (or an equivalent amount of hydrolyzable groups such as alkoxy). The greater share of the commercial silicone resins have sufficient silicon bonded hydroxy groups (e. g. at least 0.5 per cent by weight) to condense with glycerine and dicarboxylic acid or with dicarboxylic acid glycerides to give silico-alkyd resins suitable for employment in the nitrocellulose lacquers of this invention.

For preparing the silico-alkyd resins used in this invention, it has been found generally preferable, however, to employ partially condensed alkoxy silanes. One suitable method for preparing these partial condensates consists of hydrolyzing alkoxy silanes with less than the theoretical amount of water required for complete hydrolysis. Partial condensates containing at least one alkoxy group per 25 silicon atoms are readily condensed with glycerine, usually and more easily by heating above 100° C., whereupon the alkoxy groups are replaced by glycerine radicals and distilled off as alcohol. The siloxy glycerides resulting from such condensation are then reacted with dicarboxylic acids or their anhydrides. The condensation reaction is often facilitated by adding solvents such as toluene or xylene prior to the completion of the condensation. If desired, of course, partially condensed aminosilanes, acetoxysilanes, or chlorosilanes may be used in lieu of the alkoxy silanes in which case ammonia, acetic acid, and HCL respectively will be distilled off upon condensation with glycerine.

Operative herein in addition to the dicarboxylic acids are anhydrides of said dicarboxylic acids, alkyl esters of said dicarboxylic acids and acid chlorides of said dicarboxylic acids, all of which condense with glycerine to yield the resins employed in this invention. Suitable dicarboxylic acids are phthalic, terephthalic, isothalic, malonic, and maleic. Most preferred on the basis of economic availability and cost at the present time is phthalic anhydride. The lower alkyl esters of the dicarboxylic acids such as methyl, ethyl, and amyl esters may, of course, be used with equal ease.

If desired, saturated or unsaturated fatty acids having 8 to 20 carbon atoms may be incorporated in the silico-alkyd resin used in this invention. Preferred fatty acids are those of 12–20 carbon atoms. Suitable fatty acids are, for example, stearic acid, 2-ethyl hexoic acid, tung oil acid, castor oil acids, linseed oil acids, oiticia oil acids, and mixtures of such acids. These acids may be added and condensed in the silico-alkyd resins of this invention employing the methods disclosed in the copending application of Lawrence A. Rauner, Serial No. 262,893, filed December 21, 1951 (not abandoned), assigned to the same assignee as this application. If fatty acids are employed, they are used in amount up to 60 per cent (preferably at least 1 per cent) of the total weight of starting materials.

Either USP glycerine or completely anhydrous glycerine may be employed to prepare the silico-alkyd resin used in this application.

The organosilicon compounds supra are used in the amount as indicated (e. g. 25 to 90 per cent by weight) to form suitable silico-alkyd resins. However, compatibility difficulties may be experienced if in the final product, the reaction residue of the organosilicon component computed as $$R_nSiO_{\frac{4-n}{2}}$$

(where $n$ and R are as previously defined for $R_nSiX_{4-n}$) amounts to more than 30 per cent by weight of the final composition (e. g., the total weight of silico-alkyd and nitrocellulose). As a consequence, it is necessary to use smaller proportions of silico-alkyd resin in the final product if the said $$R_nSiO_{\frac{4-n}{2}}$$

content of the resin is high than if it is low. The advantages of this invention are not realized, on the other hand, when the amount of the above $$R_nSiO_{\frac{4-n}{2}}$$

component amounts to less than 2 per cent by weight of the final product. The $$R_nSiO_{\frac{4-n}{2}}$$

content may be readily computed from the starting materials. For example, in a silico-alkyd resin prepared by condensing $(CH_3)_2SiCl_2$ with glycerine and phthalic anhydride, the reaction residue of $(CH_3)_2SiCl_2$ will be $(CH_3)_2SiO$. The same residue is obtained if the starting silane were $(CH_3)_2Si(OR)_2$ or $(CH_3)_2Si(OH)_2$ or partial condensates thereof. The weight of reaction can thus be easily calculated from the weight of $(CH_3)_2SiCl_2$ or other silane employed.

The order of addition of reactants in preparation of the silico-alkyd resins used herein is not critical. Other procedures for preparing the silico-alkyd resins defined herein for use in the lacquers of this invention are thoroughly described in the patent literature, for example, in U. S. Patent No. 2,587,295 and British Patent 583,754.

The silico-alkyd resin and the nitrocellulose are admixed employing conventional procedures. Solvent mixtures of xylene, toluene, alcohols, and ketones are employed to effect lacquer solutions of the nitrocellulose and resin.

If desired, other materials such as drying catalysts, for example, cobalt naphthenate and/or pigments may be dispersed in the lacquer. The lacquers of this invention may be applied to surfaces by brushing, dipping, or spraying.

Example 1 which follows illustrates the preparation of silico-alkyd resins and nitrocellulose lacquers formed therefrom. Example 2 describes the advantages obtained by employing the lacquers of Example 1. Example 3 illustrates the useful range of silico-alkyd-nitrocellulose using a silico-alkyd resin A. About 36 per cent (by weight) of resin A is organosilicon reaction. The pencil hardness test employed is described in an article by Coleman and Smith in "Organic Finishing," January 1949, page 43. The flexibility test employed in the examples is one commonly employed in the art and consists of bending coated aluminum panels about mandrels of varying diameter. The flexibility test was conducted in accordance with Federal Specification TT-P-141b Method 622.1, and is expressed in terms of minimum mandrel diameter around which a coated panel may be bent without cracking the coating. The weatherometer test was carried out by subjecting lacquer coated cold-rolled steel panels for a period of 530 hours to an Atlas Weatherometer. In this weatherometer machine, the exposed panels are subjected to both ultra violet radiation and water spray. The water exposure is intermittent. The weatherometer device operates at a "black panel" temperature of 140° F. which is the temperature of the machine and has a 18/102 cycle, e. g. 18 minutes water spray, 102 minutes dry.

It is to be understood that the examples of this application are of illustrative nature only and indicate a preferred manner of carrying out the invention. No limitation is to be implied from the examples. The true scope of this invention is properly delineated in the appended claims.

EXAMPLE 1

The following resins were prepared:

*Resin A.*—A partially condensed silane was prepared by hydrolyzing a mixture of phenylmethyldimethoxysilane and phenyltrimethoxysilane in molar ratio 2:1 with less than the theoretical amount of water required for complete hydrolysis. The partial hydrolyzate (or condensate) was stripped of volatiles such as water and methanol and contained 20 per cent by weight methoxy groups. To 705 grams of this partial hydrolyzate was added 690 grams of a commercial liquid linseed fatty acid having a saponification value of 196.9 to 200.8 and an iodine value of 175 to 192. The partial hydrolyzate and fatty acid were heated and stirred at 200° C. whereupon 46 grams of methanol were distilled off. The mixture was cooled to 150° C. and 450 grams of anhydrous glycerine was added and the mixture was again heated to 200° C. to remove 76 grams of methanol. Following this the mixture was cooled to 150° C. and 115 grams of phthalic anhydride was added, whereupon the mixture was again heated to 200° C. to remove volatiles. During the removal of volatiles (135 grams $H_2O$), the mixture was diluted with 150 grams of xylene in order to azeotrope off the remaining water. After volatiles were removed, the mixture was diluted with 67/33 Solvesso No. 3-xylene mixture to give a solution containing 50 per cent solids. Solvesso No. 3 is a high boiling aromatic petroleum solvent available commercially.

*Resin B.*—Resin B was prepared employing the same ingredients in the same proportions as in resin A, except that 523 grams of commercial coconut oil acids having a saponification value of 260–272 and an iodine value of 8–15 were used in place of the linseed fatty acids. Resin B was diluted to 50 per cent solids in xylene.

*Resin C.*—A 50 per cent solution (67/33 Solvesso No. 3-xylene) of resin C, was prepared employing the same ingredients in the same proportion as in resin A except that 690 grams of commercial dehydrated castor oil acids were used in place of the linseed oil fatty acids.

*Resin D.*—Resin D is a commercial non-oxidizing alkyd containing 45 per cent by weight phthalic anhydride and 30 per cent by weight non-drying oil acids and having an acid member in the range from 3 to 8. This resin is sold under the name Rezyl 92–5 in the form of a 60 per cent by weight xylene solution. This alkyd resin solution was diluted to 50 per cent solids with xylene.

Resin solutions A, B, C, and D were incorporated respectively into the following nitrocellulose lacquer formula:

- 12.15 g. nitrocellulose ½ sec.[1] (RS)
- 2.2 g. dibutyl phthalate
- 27.1 g. toluene
- 15.6 g. butyl acetate
- 7.8 g. ethyl acetate
- 3.55 g. butanol
- 7.8 g. ethanol
- 23.8 g. resin solution

[1] Viscosity determined as described by J. J. Matiello in Protective and Decorative Coating, vol. II, pages 501–8, published by John Wiley and Sons.

The lacquers prepared employing resins A, B, C, and D, designated as lacquers A, B, C, and D, respectively were made up employing a conventional mixing technique as follows. Toluene was added to nitrocellulose to form a dispersion. To this dispersion was added under constant stirring the acetate and alcohol solvents, the dibutyl phthalate, and finally the resin solution.

EXAMPLE 2

Cold-rolled steel panels were dip coated with lacquers A, B, C, and D of Example 1. After air drying at room temperature for 24 hours, the films were 1 mil thick. The panels were subjected to 530 hours in the Atlas Weatherometer. At the conclusion of this test it was found that lacquers A, B, and C had retained essentially all their gloss and appeared unaffected by the test. Lacquer D, however, was dulled and crazed. Prior to the above test each film had a pencil hardness of B (after 24 hours air drying).

EXAMPLE 3

Lacquers containing mixtures of resin A and nitrocellulose were prepared in a manner of Example 1. The compositions of these lacquers indicated by the percentage by weight resin A and percentage by weight nitrocellulose based on lacquer solids are shown in columns 1 and 2 of Table 1. Aluminum panels were dip coated with these lacquers and air dried for 24 hours by which time the pencil hardness and flexibility were measured.

*Table I (see note)*

| Percent Resin A | Percent Nitrocellulose | Pencil Hardness | Flexibility, inches |
|---|---|---|---|
| 0 | 100 | 3H | ⅛ |
| 10 | 90 | 2H | ⅛ |
| 20 | 80 | 2H | ⅛ |
| 30 | 70 | 2H | ⅛ |
| 40 | 60 | 2H | ⅛ |
| 50 | 50 | 2H | ⅛ |
| 60 | 40 | 2F | ⅛ |
| 70 | 30 | 4B | ⅛ |

Table I shows that lacquer films having excellent hardness and flexibility may be prepared employing 10 to 75 per cent by weight silico-alkyd resin A (based on the total resin-nitrocellulose weight) without employing any bake.

EXAMPLE 4

A nitrocellulose lacquer having the gloss retention and craze resistance of lacquers A, B, C, when tested as in Example 2, is obtained when a silico-alkyd resin, prepared by condensing 7.2 gm. moles phenylmethyldiethoxysilane and 0.8 gm. moles phenyltriethoxysilane with 8.35 gm. moles USP glycerine and 4.57 gm. moles phthalic anhydride, is employed in the lacquer formulation of Example 1.

The lacquers of this invention are highly adaptable for use on automobile bodies since they require little if any making at elevated temperatures. Suitably hard, flexible and weather resistant films are obtained merely by air drying at room temperature.

That which is claimed is:

1. A composition of matter consisting essentially of (1) 25 to 90 per cent by weight nitrocellulose and (2) 10 to 75 per cent by weight of a silico-alkyd resin, said resin consisting of the reaction product of (a) 25 to 90 per cent by weight of an organosilicon compound selected from the group consisting of silanes having the general formula $R_nSiX_{4-n}$ where R is a monovalent hydrocarbon radical, n has a value of 1 to 2 inclusive and X is a radical selected from the group consisting of alkoxy, acyloxy, halogen, amino and hydroxyl radicals and partial condensates of said silanes, (b) 2.5 to 49 per cent by weight of glycerine (c) 5.2 to 62 per cent by weight of a compound selected from the group consisting of dicarboxylic acids, and the anhydrides, alkyl esters and acid chlorides thereof and (d) up to 60 per cent by weight of fatty acid having 8 to 20 carbon atoms; there being in the final product from 2 to 30 per cent by weight based on the total weight of (1) and (2) of the reaction residue of the organosilicon component (a) the weight of said residue being calculated on the basis of the formula $$R_nSiO_{\frac{4-n}{2}}$$

where R and n are as above defined.

2. The composition of claim 1 wherein (c) is phthalic anhydride.

3. The composition of claim 1 wherein (d) is linseed oil fatty acids.

4. The composition of claim 1 wherein the organosilicone compound has both methyl and phenyl groups attached thereto by Si-C linkages.

5. A composition of matter consisting essentially of (1) 25 to 90 per cent by weight nitrocellulose and (2) 10 to 75 per cent by weight of a silico-alkyd resin, said resin consisting of the reaction product of (a) 25 to 90 per cent by weight of an organosilicon compound selected from the group consisting of silanes having the general formula $R_nSiX_{4-n}$ where R is a radical selected from the group consisting of alkyl radicals of less than 5 carbon atoms and monocyclic aryl radicals, n has a value of 1 to 2 inclusive and X is an alkoxy radical of less than 4 carbon atoms, and partial condensates of said silanes, (b) 2.5 to 49 per cent by weight of glycerine (c) 5.2 to 62 per cent by weight of a compound selected from the group consisting of dicarboxylic acids, and the anhydrides, alkyl esters and acid chlorides thereof and (d) 1 to 60 per cent by weight of fatty acid having 8 to 20 carbon atoms; there being in the final product from 2 to 30 per cent by weight based on the total weight of (1) and (2) of the reaction residue of organosilicon component (a) the weight of said residue being calculated on the basis of the formula $$R_nSiO_{\frac{4-n}{2}}$$

where R and n are as above defined.

6. The composition of claim 5 wherein (c) is phthalic anhydride.

7. The composition of claim 5 wherein (d) is linseed oil fatty acid.

8. The composition of claim 5 wherein the organosilicon compound has both methyl and phenyl groups attached thereto through Si-C linkages.

No references cited.